United States Patent
Shirasaki et al.

(10) Patent No.: US 10,168,493 B2
(45) Date of Patent: Jan. 1, 2019

(54) OPTICAL MODULE

(71) Applicant: Mitsubishi Electric Corporation, Tokyo (JP)

(72) Inventors: Akio Shirasaki, Tokyo (JP); Norio Okada, Tokyo (JP); Nobuo Ohata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 98 days.

(21) Appl. No.: 15/283,613

(22) Filed: Oct. 3, 2016

(65) Prior Publication Data

US 2017/0227722 A1    Aug. 10, 2017

(30) Foreign Application Priority Data

Feb. 5, 2016  (JP) ................. 2016-020973

(51) Int. Cl.
    *G02B 6/42* (2006.01)
    *G01J 1/42* (2006.01)
    (Continued)

(52) U.S. Cl.
    CPC .......... *G02B 6/4212* (2013.01); *G01J 1/4257* (2013.01); *G02B 6/4204* (2013.01);
    (Continued)

(58) Field of Classification Search
    CPC .. G02B 6/4212; G02B 6/4214; G02B 6/4219; G02B 6/4228; G02B 6/4266;
    (Continued)

(56) References Cited

U.S. PATENT DOCUMENTS

| 7,263,112 B2 * | 8/2007 | Oomori ............... H01S 5/02212 257/99 |
| 2002/0080457 A1 * | 6/2002 | Nakanishi .......... G02B 6/12007 398/202 |

(Continued)

FOREIGN PATENT DOCUMENTS

| JP | 2004-273782 A | 9/2004 |
| JP | 2011-108937 A | 6/2011 |
| JP | 2014-132627 A | 7/2014 |

OTHER PUBLICATIONS

An Office Action mailed by the State Intellectual Property Office of the People's Republic of China dated Jul. 24, 2018, which corresponds to Chinese Patent Application No. 201710064400.2 and is related to U.S. Appl. No. 15/283,613.

*Primary Examiner* — John Lee
(74) *Attorney, Agent, or Firm* — Studebaker & Brackett PC

(57) ABSTRACT

An optical module includes: a stem; a temperature control module; a carrier; a light emitting element fixed on a light emitting element fixing surface of the carrier, having a front surface and a rear surface opposite to each other, emitting signal light from a first emission point in the front surface, and emitting back light from a second emission point in the rear surface; a light receiving element fixed on the carrier by a light receiving element fixing surface; a lens cap; and a lens, wherein a reflecting surface is provided on the carrier, the light receiving element receives the back light reflected by the reflecting surface, and a center of a light receiving surface of the light receiving element is positioned between the front surface and the rear surface in an optical axis direction of the signal light.

8 Claims, 12 Drawing Sheets

(51) Int. Cl.
*H04B 10/50* (2013.01)
*H04B 10/25* (2013.01)

(52) U.S. Cl.
CPC ....... *G02B 6/4266* (2013.01); *H04B 10/2504* (2013.01); *H04B 10/502* (2013.01)

(58) Field of Classification Search
CPC .. G02B 6/4268; G02B 6/4271; G02B 6/4206; G02B 6/4204; G02B 7/00; G02B 7/003; G02B 7/008; G02B 7/021; G01J 1/4257; H04B 10/2504; H04B 10/502; H04B 10/503
See application file for complete search history.

(56) References Cited

U.S. PATENT DOCUMENTS

| | | | |
|---|---|---|---|
| 2003/0102496 A1* | 6/2003 | Kuhara | G02B 6/4202 257/233 |
| 2004/0028098 A1* | 2/2004 | Miyokawa | G02B 6/4201 372/36 |
| 2004/0105681 A1* | 6/2004 | Nakanishi | G02B 6/4206 398/141 |
| 2004/0141699 A1* | 7/2004 | Sato | G02B 6/4201 385/93 |
| 2004/0240800 A1* | 12/2004 | Uchida | G02B 6/4201 385/92 |
| 2004/0245446 A1* | 12/2004 | Oomori | H01S 5/02212 250/238 |
| 2005/0008049 A1* | 1/2005 | Oomori | H01S 5/02212 372/36 |
| 2005/0063279 A1* | 3/2005 | Song | G11B 3/08512 369/99 |
| 2005/0063649 A1* | 3/2005 | Fukuda | G02B 6/4201 385/92 |
| 2005/0083568 A1* | 4/2005 | Nakae | B82Y 20/00 359/341.3 |
| 2006/0078255 A1* | 4/2006 | Bachl | G02B 6/4204 385/33 |
| 2006/0285805 A1* | 12/2006 | Healy | G02B 6/421 385/92 |
| 2007/0053392 A1* | 3/2007 | Moto | H01S 5/02252 372/29.011 |
| 2007/0127874 A1* | 6/2007 | Oomori | G02B 6/4204 385/92 |
| 2008/0166098 A1* | 7/2008 | Ibe | G02B 6/4204 385/134 |
| 2009/0129727 A1* | 5/2009 | Shimizu | G02B 6/4204 385/31 |
| 2014/0161391 A1 | 6/2014 | Ohata et al. | |
| 2015/0085388 A1* | 3/2015 | Matsusue | G02B 7/028 359/820 |
| 2015/0241636 A1* | 8/2015 | Ohata | G02B 6/4267 359/820 |
| 2017/0227722 A1* | 8/2017 | Shirasaki | G01J 1/4257 |

* cited by examiner

OPTICAL MODULE

BACKGROUND OF THE INVENTION

Field

This invention relates to an optical module used, for example, in the field of optical communication.

Background

For an optical module using a temperature control module for controlling the temperature of a light emitting element, a transistor outlined CAN (TO-CAN) type of package is available to meet a demand for reducing the size of the optical module. JP 2011-108937 A discloses a structure which has an added lens to reduce a tracking error in such an optical module. Also, J P 2014-132627 A discloses a structure using a transmissive member which expands or contracts with change in temperature.

In each of the above-described examples of the conventional art, an additional component such as a lens or a transmissive member is required, and it is necessary to secure a space in which such a component is disposed. Therefore, the length in the optical axis direction is increased and the reduction of the size of the optical module is hindered.

SUMMARY

In view of the above-described problem, an object of the present invention is to provide an optical module that simultaneously enables the reduction in size and the suppression of a tracking error.

According to the present invention, an optical module includes: a stem; a temperature control module fixed on the stem; a carrier fixed on the temperature control module; a light emitting element fixed on a light emitting element fixing surface of the carrier, having a front surface and a rear surface opposite to each other, emitting signal light from a first emission point in the front surface, and emitting back light from a second emission point in the rear surface; a light receiving element fixed on the carrier by a light receiving element fixing surface; a lens cap fixed on the stem and containing the temperature control module, the carrier, the light emitting element and the light receiving element; and a lens fixed in the lens cap and receiving the signal light, wherein a reflecting surface is provided on the carrier, the light receiving element receives the back light reflected by the reflecting surface, and a center of a light receiving surface of the light receiving element is positioned between the front surface and the rear surface in an optical axis direction of the signal light.

In the optical module according to the present invention, the center of the light receiving surface of the light receiving element is positioned between the front surface and the rear surface of the light emitting element in the direction along the optical axis of the signal light. The length in the optical axis direction can therefore be reduced, thereby simultaneously enabling the reduction in size and the suppression of a tracking error for the optical module.

DESCRIPTION OF EMBODIMENTS

An optical module according to the embodiments of the present invention will be described with reference to the drawings. The same components will be denoted by the same symbols, and the repeated description thereof may be omitted.

First Embodiment (Construction)

Figure 1A:
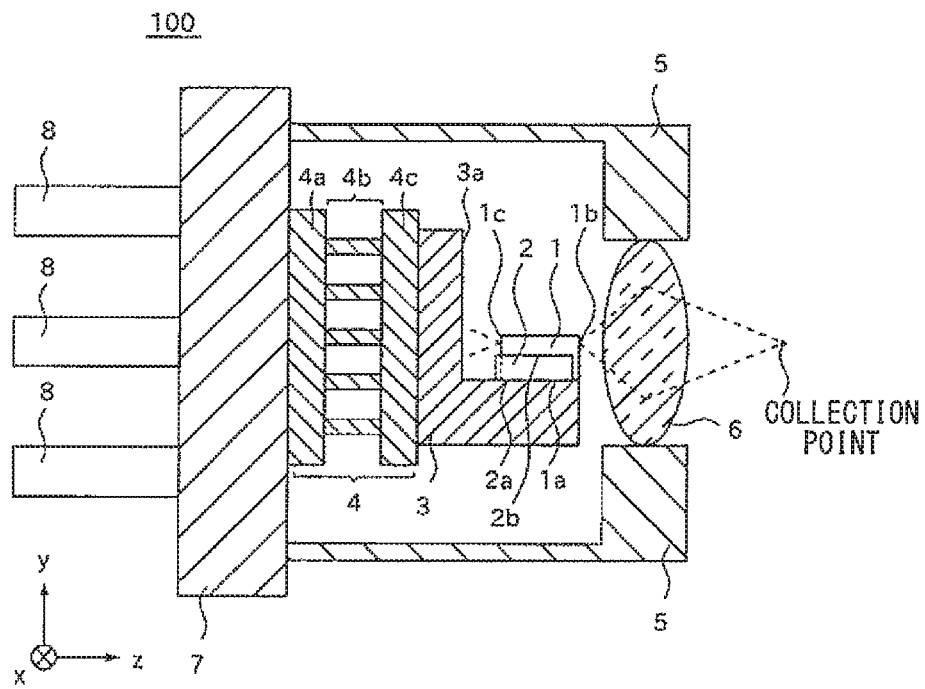
FIGS. 1A and 1B are sectional views an optical module according to a first embodiment of the present invention.
Figure 1B:
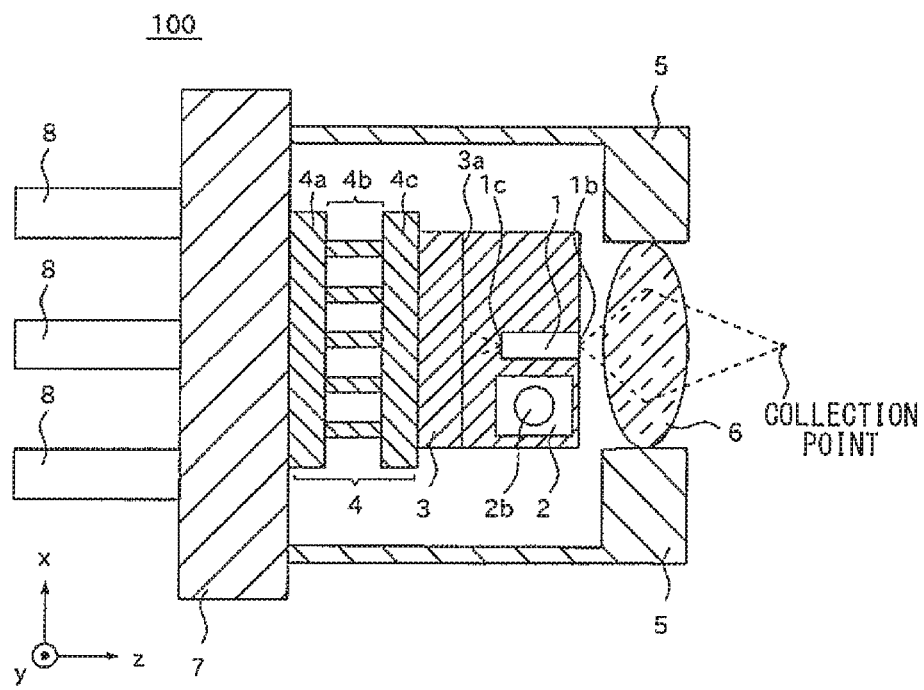

FIGS. 1A and 1B are sectional views taken along an x-axis direction and a sectional view taken along a y-axis direction, respectively, of an optical module 100 according to a first embodiment of the present invention. A temperature control module 4 is fixed on a stem 7. The temperature control module 4 is constituted of a first substrate 4a, a Peltier element 4b and a second substrate 4c. A carrier 3 is fixed on the temperature control module 4. A reflecting surface 3a which reflects light is provided on the carrier 3. A light emitting element 1 is fixed on a light emitting element fixing surface 1a of the carrier 3. The light emitting element 1 has a front surface 1b and a rear surface 1c. Further, a light receiving element 2 is fixed on the carrier 3 by a light receiving element fixing surface 2a. The light receiving element 2 has a light receiving surface 2b. A center of the light receiving surface 2b is positioned between the front surface 1b and the rear surface 1c in a z-axis direction, which is a signal light optical axis direction. The light receiving surface 2b is positioned close to the light receiving element fixing surface 2a relative to a back light emission point in the y-axis direction perpendicular to the light receiving surface 2b. A cylindrical lens cap 5 is fixed on the stem 7. The stem 7 and the cylindrical lens cap 5 form a container containing the temperature control module 4, the carrier 3, the light emitting element 1 and the light receiving element 2. A lens 6 is fixed in the lens cap 5. Lead pins 8 for signal transmitting or receiving and power and ground supply are passed through or connected to the stem 7. A semiconductor laser is typically used as the light emitting element 1. A semiconductor laser with optical modulators monolithically integrated therein may also be used.

The materials of the components will be described. The material of the stem 7 is a metal such as cold-rolled steel plate (SPC). The materials of the first substrate 4a and the second substrate 4c of the temperature control module 4 are a ceramic material such as aluminum nitride or alumina. The material of the carrier 3 is a metal compound such as copper tungsten. The material of the lens cap 5 is a metal such as stainless steel (SUS).

(Operation)

The operation of the optical module 100 according to the first embodiment includes emission of signal light to the outside, transmission of back light intensity to the outside and control for constantly maintaining the temperature of the light emitting element 1. These sorts of control will be described in detail below.

Signal light is emitted from the light emitting element 1 and collected by the lens 6. The collected light is led to the outside by an optical fiber (not shown). The signal light is emitted from a signal light emission point in the front surface 1b of the light emitting element 1, as indicated by dot lines in FIG. 1. The signal light is collected on a collection point by the lens 6 and led to the outside by the optical fiber. The signal light is externally modulated through the lead pins 8.

Back light is emitted from the light emitting element 1 and reflected by the reflecting surface 3a. Part of the reflected light is converted into an electrical current by the light receiving element 2, and the current is transmitted to the outside. The back light is emitted from a back light emission point in the rear surface 1c of the light emitting element 1 in a diffusing manner, as indicated by dotted lines in FIGS. 1A and 1B. The back light emitted from the back light emission point is reflected by the reflecting surface 3a, and part of the reflected back light is received by the light receiving element 2 through the light receiving surface 2b. The light incident on the light receiving surface 2b is converted into an electrical current corresponding to the intensity of the light, and the current is transmitted to the outside through the lead pins 8. A controller (not shown) externally provided controls the signal light intensity on the basis of the current value so that the signal light intensity is constant.

The temperature of the light emitting element 1 is controlled by the temperature control module 4 so as to be constant. In general, the wavelength and the intensity of the signal light emitted from the light emitting element 1 vary depending on the temperature of the light emitting element 1. Therefore, restricting variations in wavelength and intensity of the signal light within certain limits requires making the temperature of the light emitting element 1 constant. Also, in general, the ratio of the intensities of the signal light and the back light emitted from the light emitting element 1 varies depending on the temperature of the light emitting element 1. If this intensity ratio varies, the signal light intensity is not constantly maintained, resulting in the occurrence of a tracking error. There is a need to constantly maintain the temperature of the light emitting element 1 for the purpose of suppressing this tracking error as well. Therefore, the temperature control module 4 absorbs heat from the light emitting element 1 through the carrier 3 or provides heat to the light emitting element 1, thereby constantly maintaining the temperature of the light emitting element 1.

(Cause of Occurrence of Tracking Error)

What is thought to be a cause of a tracking error in the optical module 100 includes a warp of the stem 7 and thermal expansion or shrinkage of the lens cap. The reasons for the occurrences of tracking errors due to such phenomena will be described below. Note that, in the optical module 100, changes in the positional relationship between the light emitting element 1 and the light receiving element 2 and the temperature difference between these elements are small because these elements are fixed on the carrier 3 mounted on the temperature control module 4. However, each of changes in the temperatures of the stem 7 and the lens cap 5 can be a cause of a tracking error since the temperature control module 4 does not control the temperatures of the stem 7 and the cap 5.

Figure 2:
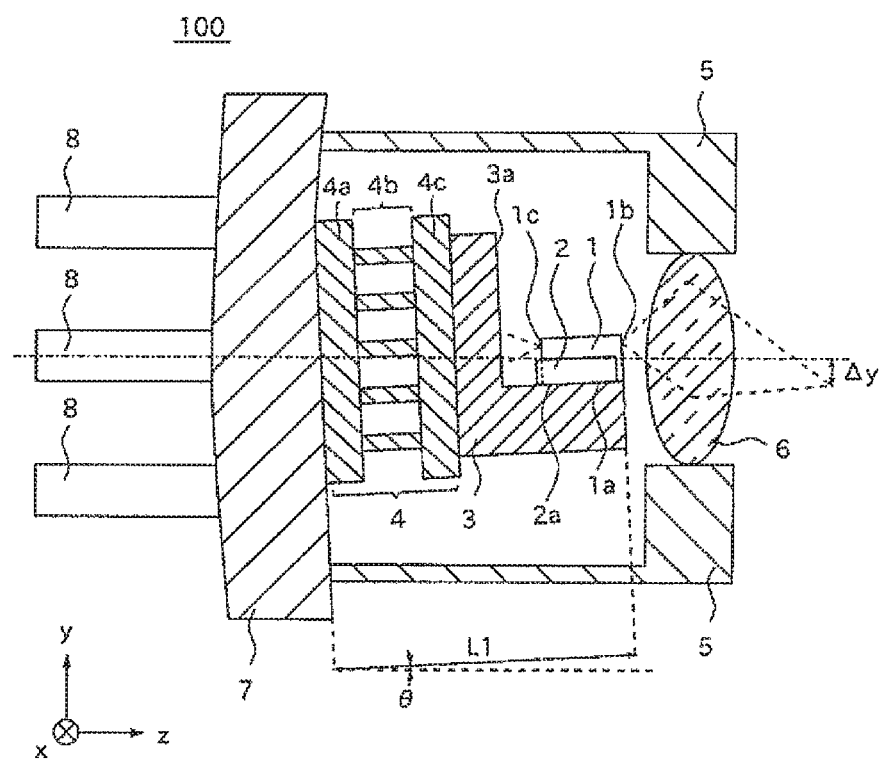
FIG. 2 shows that a collection point is shifted in a y-axis direction by a warp of a stem.

When the stem 7 is warped, the position of the signal light emission point is shifted and a tracking error occurs. The stem 7 is made, for example, of SPC, while the first substrate 4a of the temperature control module 4 is made, for example, of aluminum nitride. The linear expansion coefficient of SPC is, for example, $13.9 \times 10^{-6}$ (1/K), and the linear expansion coefficient of aluminum nitride is, for example, $4.5 \times 10^{-6}$ (1/K). That is, the linear expansion coefficient of the stem 7 is larger than that of the first substrate 4a. For example, when the ambient temperature is increased, the stem 7 starts expanding but a portion of the stem 7 close to the first substrate 4a is restrained by the first substrate 4a having the smaller linear expansion coefficient from expanding, while a portion of the stem 7 located away from the first substrate 4a expands more than the close portion. As a result, a warp is caused in the stem 7. There is a possibility of the signal light emission point being shifted in the y-axis direction by this warp, as shown in FIG. 2. If the signal light emission point is shifted in the y-axis direction, the position of the collection point is changed. The end surface of the optical fiber for leading the signal light to the outside is typically disposed in the vicinity of the collection point. Therefore, if the position of the collection point is changed, the efficiency of coupling of the signal light to the optical fiber is reduced and a tracking error occurs. It can be understood from the above that a tracking error occurs when a warp is caused in the stem 7 by a change in ambient temperature. While a case where the signal emission point is shifted in the y-axis direction has been described by way of example, a shift of the point in the x-axis direction may also occur depending on the direction in which the stem warps. Also in such a case, a tracking error occurs in a way similar to the way in which an error occurs in the case where the signal emission point is shifted in the y-axis direction.

Figure 3:
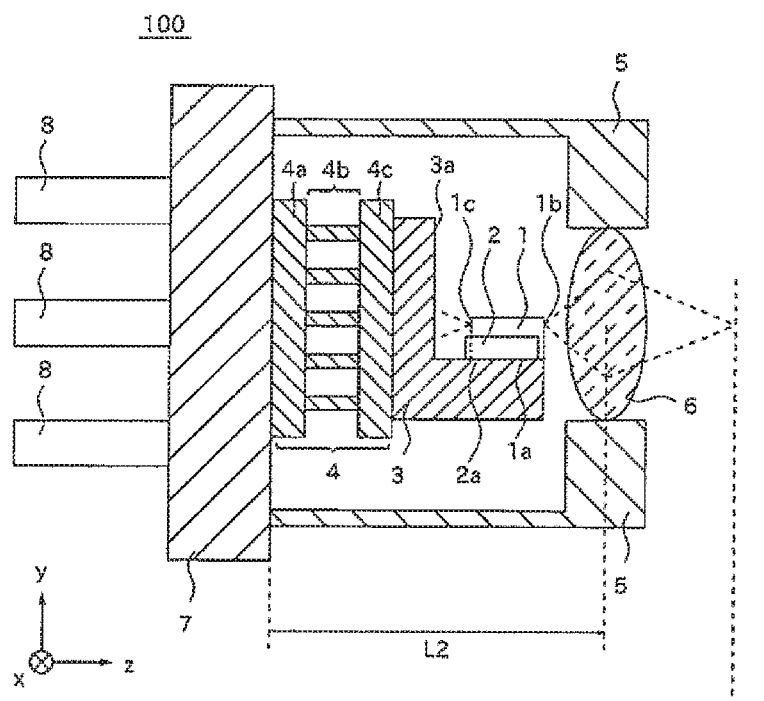
FIG. 3 shows that a collection point is shifted in a y-axis direction by thermal expansion or shrinkage of the lens cap.
Figure 3:
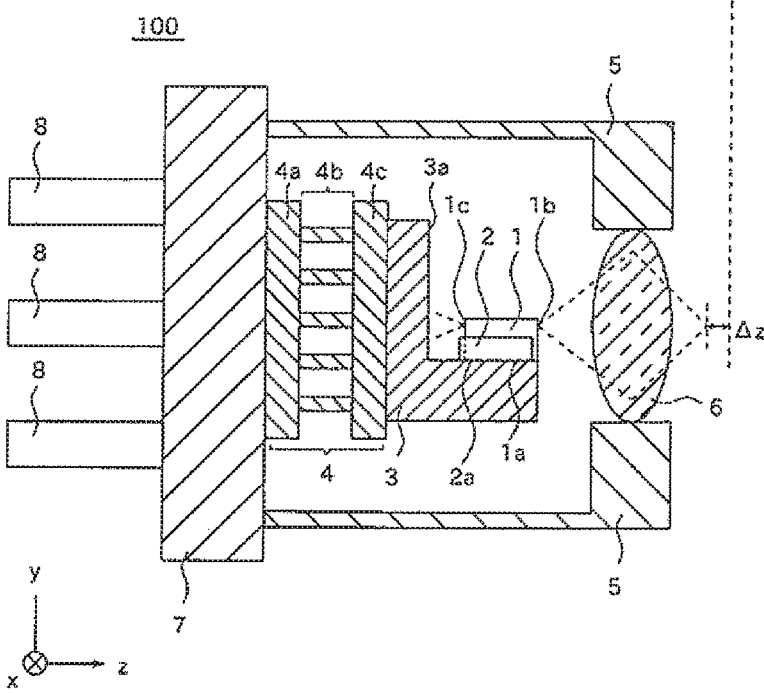

When thermal expansion or shrinkage of the lens cap 5 occurs, the position of the signal light emission point is shifted and a tracking error occurs. The lens cap 5 is made, for example, of SUS. With change in ambient temperature, the temperature of the lens cap 5 changes and the lens cap 5 expands or shrinks. On the other hand, substantially no expansion or shrinkage of the carrier 3 is caused by a change in ambient temperature, since the temperature of the carrier 3 is controlled by the temperature control module 4 so as to be generally constant. Therefore, the amount of expansion or shrinkage of the lens cap 5 in the z-axis direction caused by a change in ambient temperature is the amount of change in the distance from the front surface 1b of the light emitting element 1 to the lens 6. If this distance is changed, the position of the collection point is changed, as shown in FIG. 3. If the position of the collection point is changed, the efficiency of coupling of the signal light to the optical fiber is reduced and a tracking error occurs. It can be understood from the above that a tracking error occurs when the lens cap 5 expands or shrinks in the z-axis direction with change in ambient pressure.

Advantages of the Invention

The advantages of the arrangement of the present invention applied to the optical module 100 according to the first embodiment reside in the reduction in size and the suppression of tracking errors. The reasons that the invention has these advantages will be described below.

Figure 4:
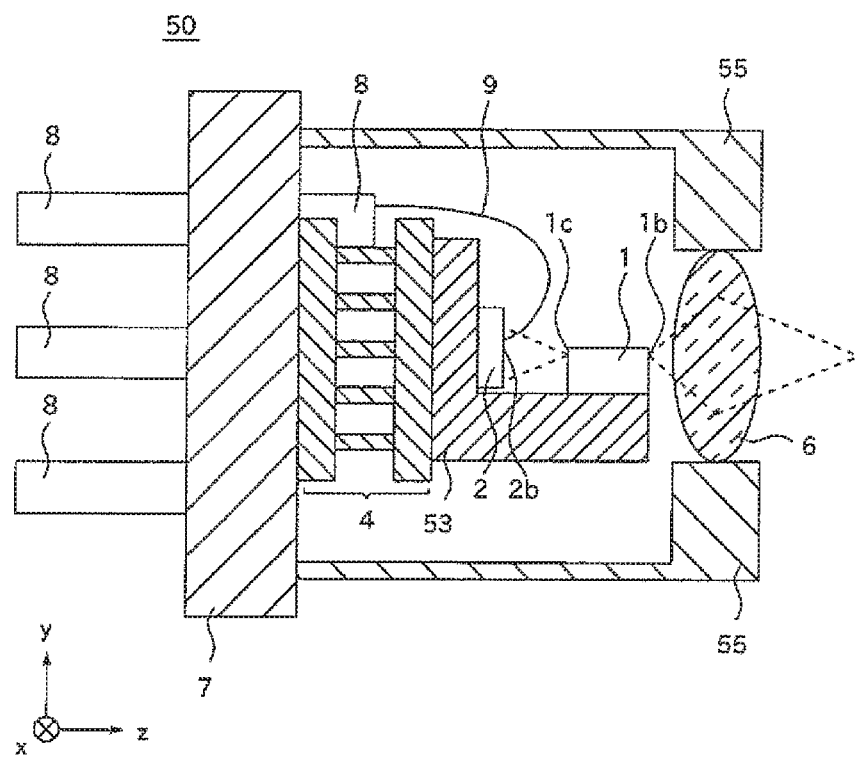
FIG. 4 is a sectional view of a conventional optical module.

In the optical module 100 according to the first embodiment, the lengths of the carrier 3 and the lens cap 5 in the z-axis direction can be reduced so that the size of the module is reduced. The reason for this will be described by comparing the optical module according to the first embodiment with a conventional optical module. FIG. 4 is a sectional view of a conventional optical module 50. A light receiving element 2 of the conventional optical module 50 is disposed in the position the light receiving surface 2b directly receives back light. On the other hand, in the optical module 100 according to the first embodiment, the light receiving element 2 is disposed so that the center of the light receiving surface 2b is located between the front surface 1b and the rear surface 1c of the light emitting element 1 in the z-axis direction. Therefore, the length of the carrier 3 in the z-axis direction can be reduced in comparison with the conventional optical module 50. Further, in the conventional optical module 50, there is a need to pass between the rear surface 1c and the light receiving surface 1c a piece of wiring 9 for connection between the light receiving element 2 and a lead pin 8. In the optical module 100 according to the first embodiment, there is no need to pass a piece of wiring (not shown) at the rear of the rear surface 1c. Therefore, the length of the carrier 3 in the z-axis direction can be further reduced. The length of the lens cap 5 can also be reduced correspondingly. The size of the optical module can thus be reduced. According to calculations made by the inventors of the present invention on a trial basis, the length of the carrier 3 can be reduced by about 0.4 mm relative to that in the conventional optical module 50, and the length of the lens cap 5 can also be reduced by about 0.4 mm.

If the length of the carrier 3 or the lens cap 5 in the z-axis direction is reduced, a tracking error is reduced. The reason for this will be described below.

Figure 5:
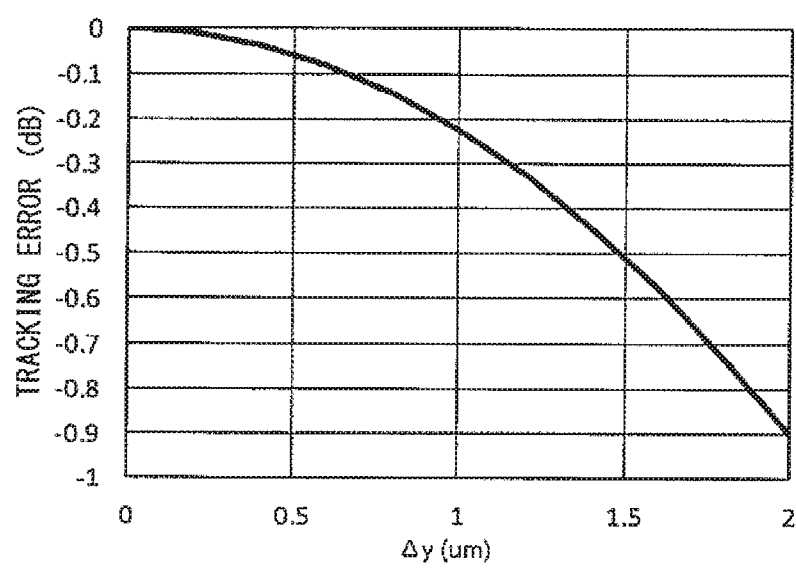
FIG. 5 shows a relationship between the change of the position of the collection point in the y-axis direction and a tracking error.

The reason that a tracking error is reduced if the length of the carrier 3 in the z-axis direction is reduced is that the positional deviation of the signal light emission point when a warp occurs in the stem 7 is limited. When a warp occurs in the stem 7 due to a change in ambient temperature, the position of the collection point in the y-axis direction is changed, as described above. The change Δy of the position of the collection point at this time is expressed by the following equation:

$$\Delta y = \tan\theta \times L1 \times M \quad (1)$$

where θ is the angle through which the temperature control module and the carrier are inclined as a result of the occurrence of the warp in the stem 7; L1 is the distance from the stem 7 to the front surface 1b of the light emitting element 1; and M is the magnification of the lens 6. As can be understood from FIG. 2, L1 becomes smaller if the lens of the carrier 3 in the z-axis direction is reduced. It can be understood from equation (1) that Δy becomes smaller if L1 is reduced. From FIG. 5 showing the relationship between Δy and a tracking error, it can be understood that the tracking error becomes smaller if Δy is reduced. While the tracking error is shown as a negative value in FIG. 5, the magnitude of the tracking error considered here is the absolute value of the tracking error. It can be understood from the above that a tracking error becomes smaller if the length of the carrier 3 is reduced. While the description has been made by assuming that the position of the collection point changes in the y-axis direction, the position of the collection point may also change in the x-axis direction in actuality. Also in such a case, the same effect can be obtained, that is, a tracking error becomes smaller if the length of the carrier 3 is reduced.

Figure 6:
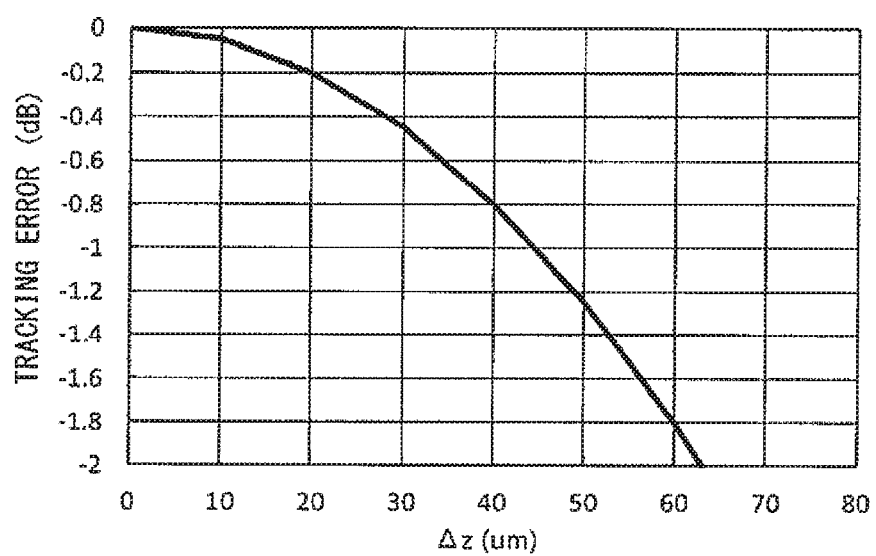
FIG. 6 shows a relationship between the change of the position of the collection point in the z-axis direction and a tracking error.

The reason that a tracking error becomes smaller if the length of the lens cap 5 in the z-axis direction is reduced is that the positional deviation of the signal light emission point when thermal expansion or shrinkage of the lens cap 5 occurs is limited. When thermal expansion or shrinkage of the lens cap 5 in the z-axis direction occurs due to a change in ambient temperature, the position of the collection point in the z-axis direction is changed, as described above. The change Δz of the position of the collection point at this time is expressed by the following equation:

$$\Delta z = \Delta T \times \alpha \times L2 \times M^2 \quad (2)$$

where ΔT is the amount of change in ambient temperature; α is the linear expansion coefficient of the lens cap 5; L2 is the length of the lens cap 5 (the length from the end on the stem side to the center of the lens); and M is the magnification of the lens 6. As can be understood from equation (2), Δz becomes smaller if L2 is reduced. Also, from FIG. 6 showing the relationship between Δz and a tracking error, it can be understood that the tracking error becomes smaller if Δz is reduced. While the tracking error is shown as a negative value in FIG. 6, the magnitude of the tracking error considered here is the absolute value of the tracking error. It can be understood from the above that a tracking error becomes smaller if the length of the lens cap 5 is reduced.

As an example, estimation of a tracking error in the optical module 100 according to the first embodiment made to determine to what extent the tracking error is reduced in comparison with the conventional optical module 50 has shown the result which is 0.16 dB. Calculations for this estimation will be described below.

The reduction in tracking error as a result of occurrence of the change Δy in the position of the collection point is estimated at 0.04 dB. This estimate was made by assuming, as estimation conditions, θ=0.005 degrees, M=3.5, L1=2.6 mm in the conventional optical module 50 and L1=2.2 mm in the optical module 100 according to the first embodiment. Under these conditions, from equation (1), Δy in the conventional optical module 50 is calculated to be Δy=0.79 μm, and Δy in the optical module 100 according to the first embodiment is calculated to be Δy=0.67 μm. From these values, a tracking error of 0.14 dB in the conventional optical module 50 and a tracking error of 0.10 dB in the optical module 100 according to the first embodiment are determined by using FIG. 5. It can be understood from the above that the tracking error is reduced by 0.04 dB.

The reduction in tracking error as a result of occurrence of the change Δz in the position of the collection point is estimated at 0.08 dB. This estimate was made by assuming, as estimation conditions, ΔT=70° C., α=10.4×10⁻⁶ (1/K), M=3.5, L2=3.7 mm in the conventional optical module 50 and L2=3.3 mm in the optical module 100 according to the first embodiment. Under these conditions, from equation (2), Δz in the conventional optical module 50 is calculated to be Δz=33.0 μm, and Δz in the optical module 100 according to the first embodiment is calculated to be Δz=29.4 μm. From these values, a tracking error of 0.55 dB in the conventional optical module 50 and a tracking error of 0.43 dB in the optical module 100 according to the first embodiment are determined by using FIG. 6. It can be understood from the above that the tracking error is reduced by 0.12 dB.

The above-described reductions in tracking error are combined to determine a reduction in tracking error of 0.16 dB in the optical module 100 according to the first embodiment relative to the tracking error in the conventional optical module 50.

Second Embodiment

An optical module according to a second embodiment of the present invention will be described mainly with respect to a point of difference from the optical module according to the first embodiment.
(Construction)

Figure 7A:
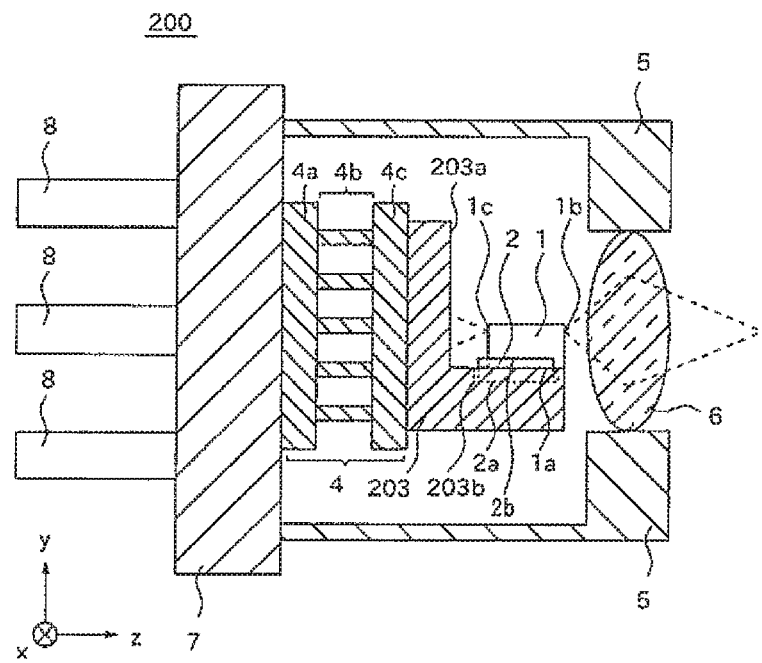
FIGS. 7A and 7B are sectional views of an optical module according to a second embodiment of the present invention.
Figure 7B:
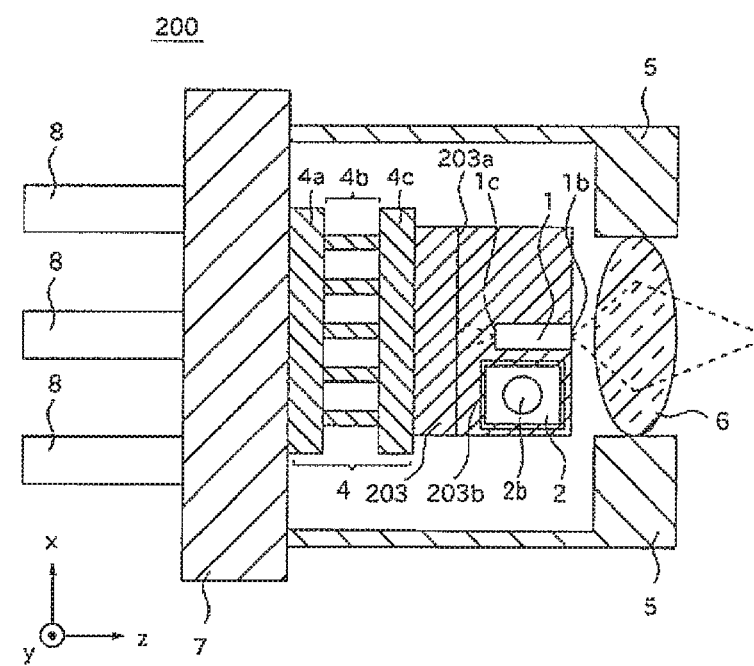
Figure 8:
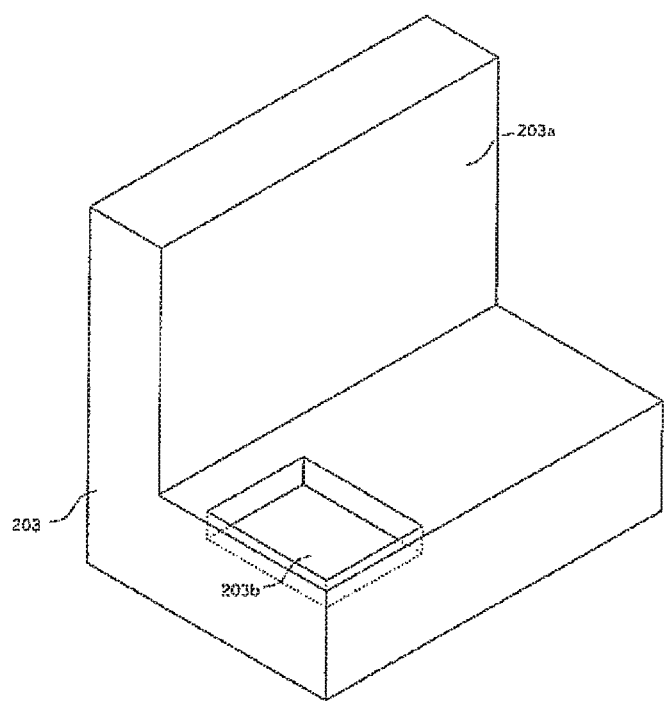
FIG. 8 is a perspective view of a carrier according to the second embodiment of the present invention.

FIGS. 7A and 7B are sectional views of an optical module 200 according to the second embodiment. FIG. 7A is a sectional view of the optical module 200 as seen in the x-axis direction, and FIG. 7B is a sectional view of the optical module 200 as seen in the y-axis direction. FIG. 8 is a perspective view of a carrier 203 in the optical module 200 according to the second embodiment. In the optical module 200 according to the second embodiment, a recess 203b is provided in the carrier 203, and the light receiving element 2 is fixed by the light receiving element fixing surface 2a in the recess 203b.

Advantages of the Invention

In the optical module 200 according to the second embodiment, the light receiving element 2 is fixed in the recess 203b. Accordingly, the light receiving surface 2b is positioned closer to the light receiving element fixing surface 2a than in the optical module 100 according to the first embodiment. As a result, the quantity of light received by the light receiving element 2 in back light emitted from the rear surface 1c of the light emitting element 1 and reflected by a reflecting surface 203a is increased relative to that in the optical module 100 according to the first embodiment.

Further, it is made easier to secure the necessary quantity of received light, thereby permitting relaxing a mount tolerance for the light receiving element 2.

Third Embodiment

An optical module according to a third embodiment of the present invention will be described mainly with respect to a point of difference from the optical module according to the first embodiment.
(Construction)

Figure 9A:
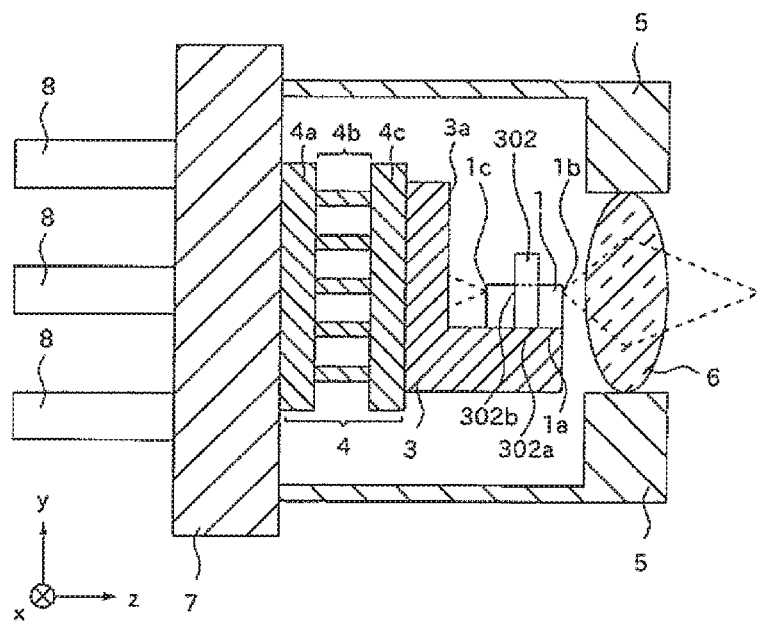
FIGS. 9A and 9B are sectional views of an optical module according to a third embodiment of the present invention.
Figure 9B:
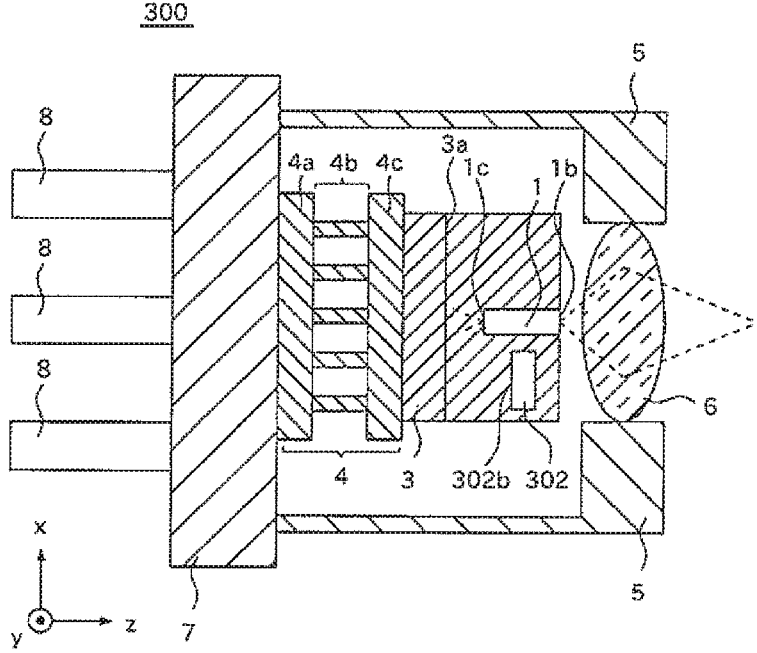

FIGS. 9A and 9B are sectional views of an optical module 300 according to the third embodiment. FIG. 9A is a sectional view of the optical module 300 as seen in the x-axis direction, and FIG. 9B is a sectional view of the optical module 300 as seen in the y-axis direction. In the optical module 300 according to the third embodiment, a light receiving surface 302b of a light receiving element 302 is opposed to the reflecting surface 3a provided on the carrier 3.

Advantages of the Invention

In the optical module 300 according to the third embodiment, the light receiving surface 302b of the light receiving element 302 is opposed to the reflecting surface 3a. As a result, the quantity of light received by the light receiving element 302 in back light emitted from the rear surface 1c of the light emitting element 1 and reflected by the reflecting surface 3a is increased relative to that in the optical module 100 according to the first embodiment.

Further, it is made easier to secure the necessary quantity of received light, thereby permitting relaxing a mount tolerance for the light receiving element 302.

Fourth Embodiment

An optical module according to a fourth embodiment of the present invention will be described mainly with respect to a point of difference from the optical module according to the first embodiment.
(Construction)

Figure 10A:
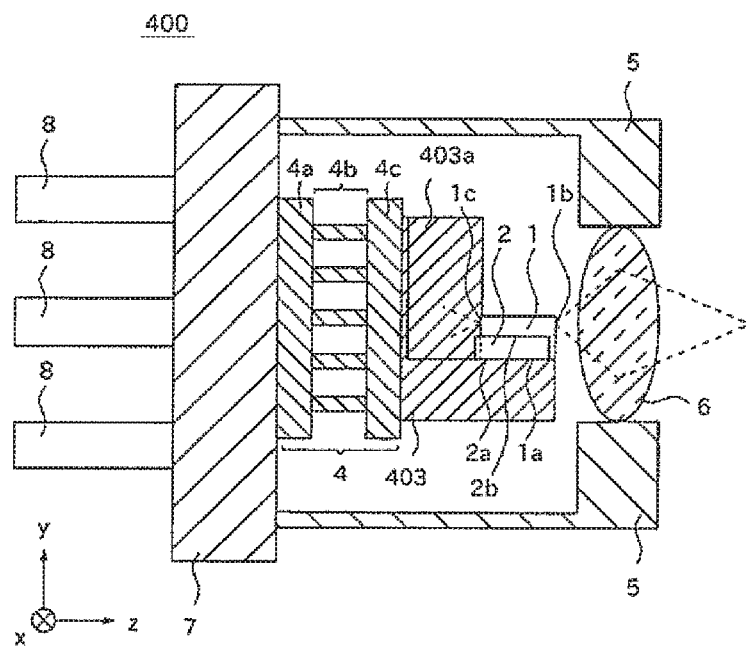
FIGS. 10A and 10B are sectional views of an optical module according to a fourth embodiment of the present invention.
Figure 10B:
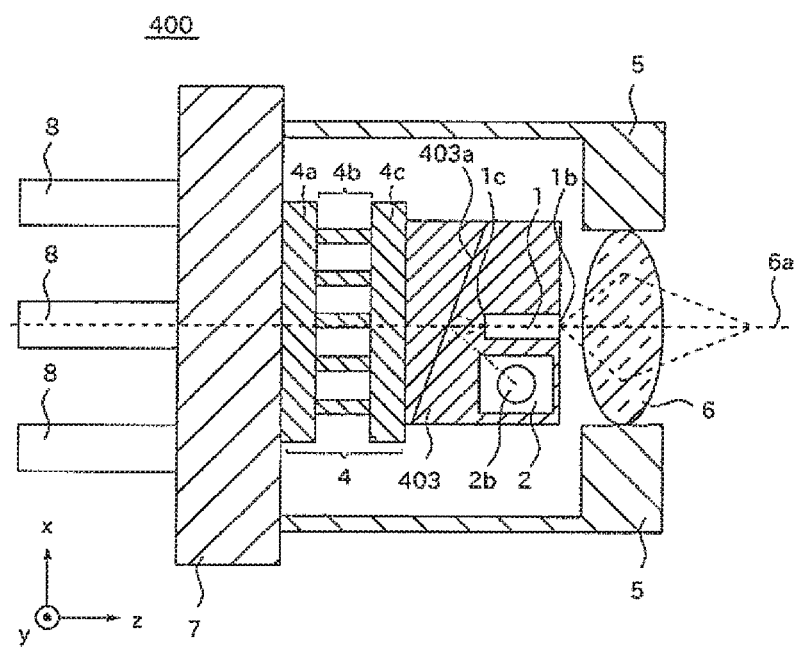

FIGS. 10A and 10B are sectional views of an optical module 400 according to the fourth embodiment. FIG. 10A is a sectional view of the optical module 400 as seen in the x-axis direction, and FIG. 10B is a sectional view of the optical module 400 as seen in the y-axis direction. In the optical module 400 according to the fourth embodiment, a reflecting surface 403a provided on a carrier 403 is inclined with respect to a lens optical axis 6a as seen in the y-axis direction perpendicular to the light emitting element fixing surface 1a. The direction of the inclination is determined so that back light emitted perpendicularly to the rear surface 1c is reflected toward the light receiving surface 2b of the light receiving element 2. In FIG. 10B, a state in which the back light emitted from the light emitting element 1 perpendicularly to the rear surface 1c is reflected by the reflecting surface 403a to travel toward the light receiving surface 2b is indicated by dot-dash lines in FIG. 10B.

Advantages of the Invention

In general, the intensity of back light emitted from the light emitting element 1 is highest in the direction perpendicular to the rear surface 1c. In the optical module 400 according to the fourth embodiment, back light emitted perpendicularly to the rear surface 1c of the light emitting element 1 is reflected toward the light receiving surface 2b, as described above. In the optical module 400 according to the fourth embodiment, therefore, the quantity of light received by the light receiving element 2 in the backlight emitted from the rear surface 1c of the light emitting element 1 and reflected by the reflecting surface 403a is increased relative to that in the optical module 100 according to the first embodiment.

Further, it is made easier to secure the necessary quantity of received light, thereby permitting relaxing a mount tolerance for the light receiving element 2.

In general, if the backlight is coupled to an optical fiber for transmitting signal light to the outside, the quality of the signal light is reduced. In particular, in a case where the light emitting element 1 is a semiconductor laser in which electric-field-absorption-type modulators are integrated, the quality of signal light is further reduced since the back light is continuous light. In the optical module 400 according to the fourth embodiment, the back light emitted perpendicularly to the rear surface 1a is obliquely reflected by the reflecting surface 403a. Therefore, the back light emitted perpendicularly to the rear surface 1a is not easily coupled to the optical fiber. As a result, degradation in quality of the signal light does not occur easily in comparison with the optical module 100 according to the first embodiment.

The arrangement of the present invention applied to the optical module 400 according to the fourth embodiment can also be applied to the first to third embodiments.

Fifth Embodiment

An optical module according to a fifth embodiment of the present invention will be described mainly with respect to a point of difference from the optical module according to the first embodiment.

(Construction)

Figure 11A:
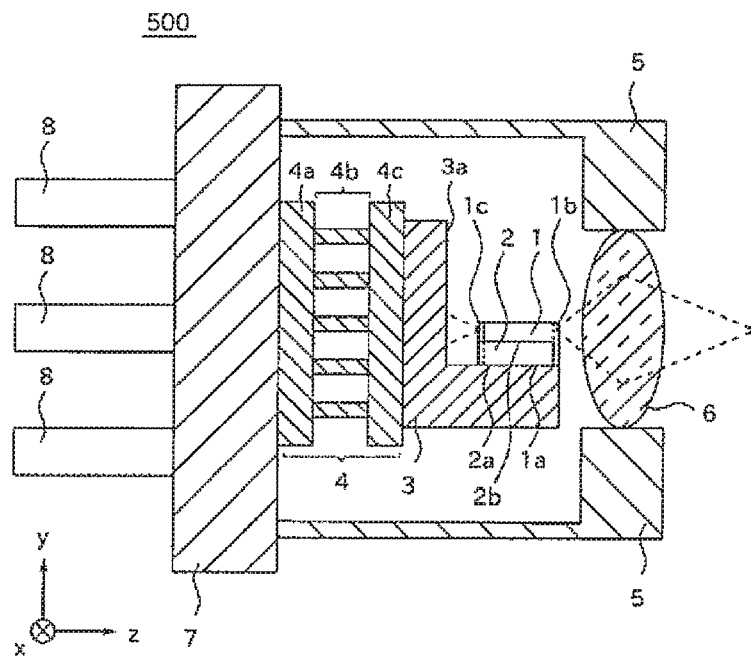
FIGS. 11A and 11B are sectional views of an optical module according to a fifth embodiment of the present invention.
Figure 11B:
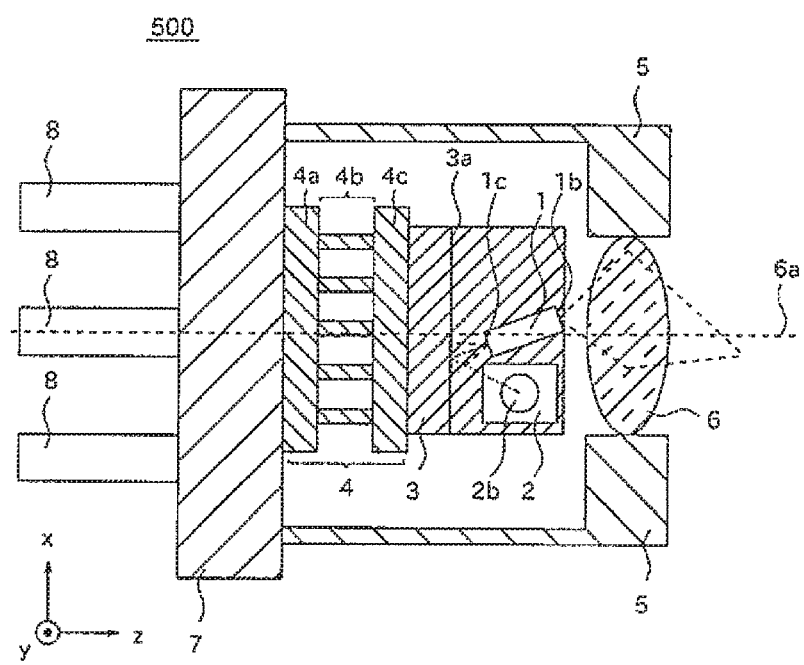

FIGS. 11A and 11B are sectional views of an optical module 500 according to the fifth embodiment. FIG. 11A is a sectional view of the optical module 500 as seen in the x-axis direction, and FIG. 11B is a sectional view of the optical module 500 as seen in the y-axis direction. In the optical module 500 according to the fifth embodiment, the light emitting element 1 is inclined with respect to a lens optical axis 6a as seen in the y-axis direction perpendicular to the light emitting element fixing surface 1a. The direction of the inclination is determined so that the reflecting surface 3a provided on the carrier 3 reflects toward the light receiving surface 2b back light emitted perpendicularly to the rear surface 1c. In FIG. 11B, a state in which the back light emitted from the light emitting element 1 perpendicularly to the rear surface 1c is reflected by the reflecting surface 3a to travel toward the light receiving surface 2b is indicated by dot-dash lines in FIG. 10B.

Advantages of the Invention

In the optical module 500 according to the fifth embodiment, the quantity of light received by the light receiving element 2 in the backlight emitted from the rear surface 1c of the light emitting element 1 and reflected by the reflecting surface 3a is increased relative to that in the optical module 100 according to the first embodiment for the same reason as that for the optical module 400 according to the fourth embodiment.

Further, it is made easier to secure the necessary quantity of received light, thereby permitting relaxing a mount tolerance for the light receiving element 2. Also, degradation in quality of the signal light does not occur easily.

The arrangement of the present invention applied to the optical module 500 according to the fifth embodiment can also be applied to the first to third embodiments.

Sixth Embodiment

An optical module according to a sixth embodiment of the present invention will be described mainly with respect to a point of difference from the optical module according to the first embodiment.

(Construction)

Figure 12A:
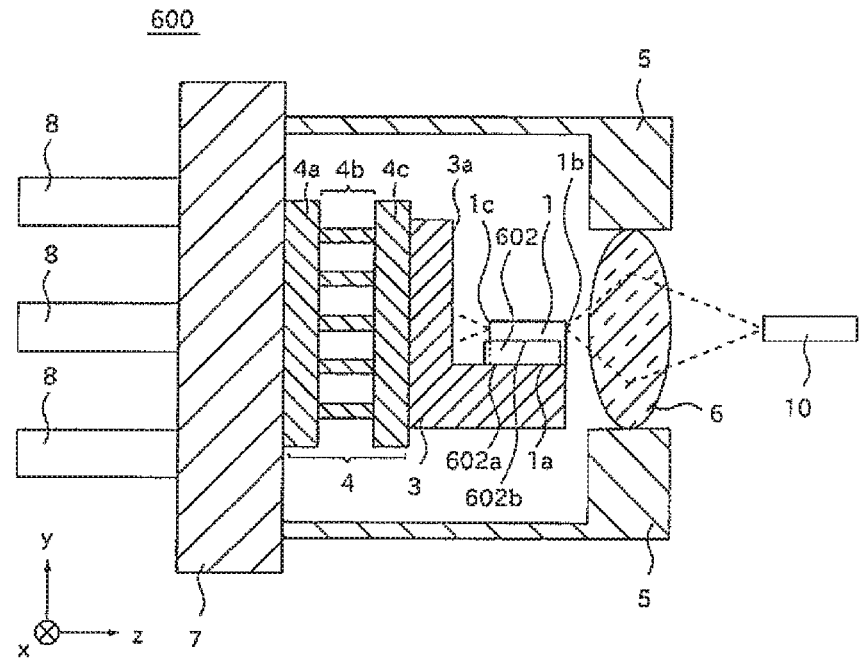
FIGS. 12A and 12B are sectional views of an optical module according to a sixth embodiment of the present invention.
Figure 12B:
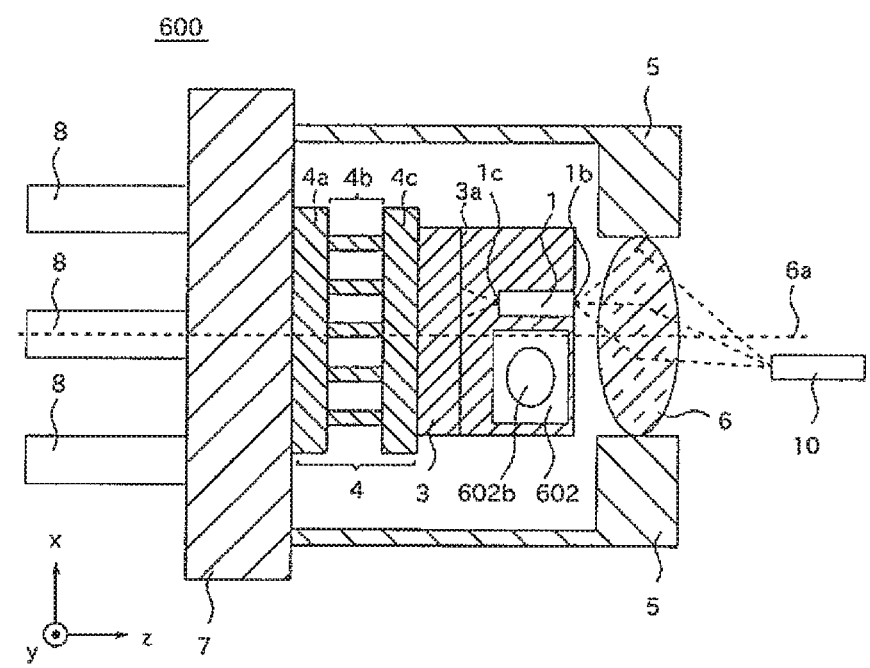

FIGS. 12A and 12B are sectional views of an optical module 600 according to the sixth embodiment. FIG. 12A is a sectional view of the optical module 600 as seen in the x-axis direction, and FIG. 12B is a sectional view of the optical module 600 as seen in the y-axis direction. In the optical module 600 according to the sixth embodiment, the light emitting element 1 is disposed by being deviated from a lens optical axis 6a as seen in the y-axis direction perpendicular to the light emitting element fixing surface 1a. Signal light emitted from the light emitting element 1 is collected by the lens 6 and the collected light is lead to the outside by an optical fiber 10. The optical axis of the signal light incident on the optical fiber 10 is inclined with respect to the end surface of the optical fiber 10 is oblique to the end surface of the optical fiber as seen in the y-axis direction, as shown in FIG. 12.

Advantages of the Invention

In general, the quality of signal light is reduced when the signal light is returned to the signal light emission point. In the optical module 600 according to the sixth embodiment, the optical axis of the signal light is oblique to the end surface of the optical fiber. Therefore, the signal light reflected by the end surface of the optical fiber is not easily returned to the signal light emission point on the light emitting element 1. As a result, degradation in quality of the signal light does not occur easily.

Further, the area of a light receiving surface 602b of a light receiving element 602 can be increased. This is because a vacant space is formed on the carrier 3 since the light emitting element 1 is deviated from the lens optical axis 6a, and because the light receiving element 602 with the light receiving surface 602b having an increased area can be disposed by using the vacant space.

Figure 13:
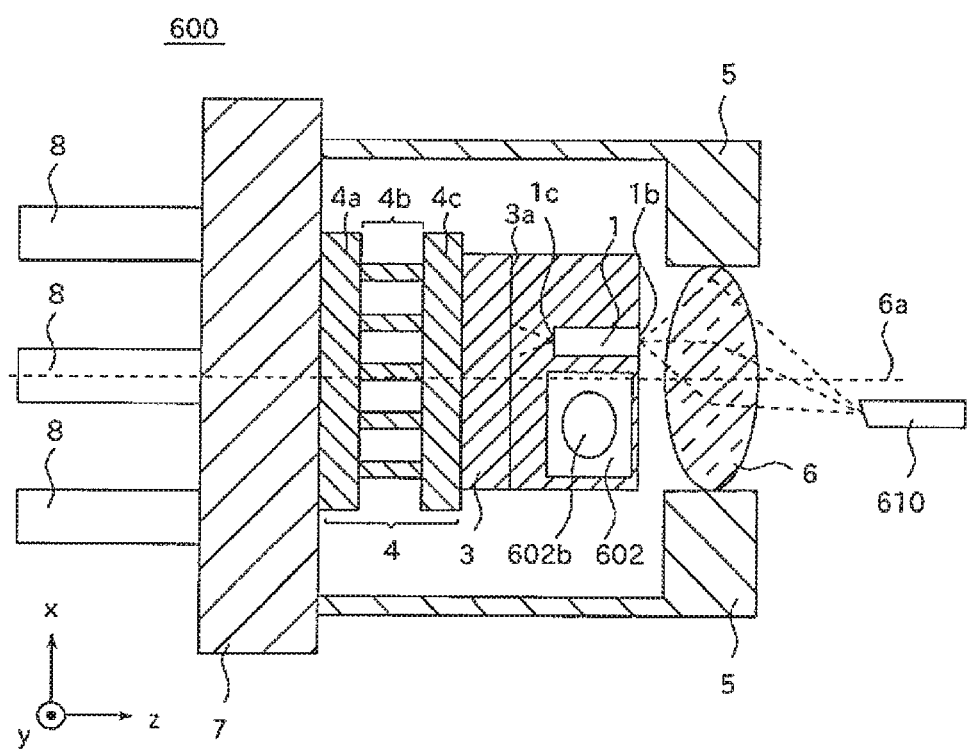
FIG. 13 is a sectional view of the optical module according to a sixth embodiment of the present invention in which an angle-lapped end surface is disposed.

In the optical module 600 according to the sixth embodiment, it is preferable to perform angle lap on the end surface of the optical fiber. FIG. 13 is a sectional view seen in the y-axis direction of the optical module 600 according to the sixth embodiment in which an optical fiber 620 having an angle-lapped end surface is disposed. In this case, it is preferable to adjust the angle of the light emitting element 1 when disposing this element so that the efficiency of coupling of the signal light to the optical fiber 610 is optimized according to Snell's law.

The arrangement of the present invention applied to the optical module 600 according to the sixth embodiment can also be applied to the first to fifth embodiments.

Obviously many modifications and variations of the present invention are possible in the light of the above teachings. It is therefore to be understood that within the scope of the appended claims the invention may be practiced otherwise than as specifically described.

The entire disclosure of Japanese Patent Application No. 2016-020973, filed on Feb. 5, 2016 including specification, claims, drawings and summary, on which the Convention priority of the present application is based, is incorporated herein by reference in its entirety.

The invention claimed is:

1. An optical module comprising:
    a stem;
    a temperature control module fixed on the stem;
    a carrier fixed on the temperature control module, the carrier having a fixing surface;
    a light emitting element fixed on the fixing surface, having a front surface and a rear surface opposite to each other, emitting signal light from a first emission point in the front surface, and emitting back light from a second emission point in the rear surface;
    a light receiving element fixed on the fixing surface, the light receiving element having a light receiving surface having a center, the center positioned between the front surface and the rear surface in an optical axis direction of the signal light when viewing the light emitting element and the light receiving element from a direction perpendicular to the optical axis direction and parallel to the fixing surface;
    a lens cap fixed on the stem and containing the temperature control module, the carrier, the light emitting element and the light receiving element; and
    a lens fixed in the lens cap and receiving the signal light, wherein a reflecting surface is provided on the carrier, and the light receiving element receives the back light reflected by the reflecting surface.

2. The optical module according to claim 1, wherein the light receiving surface is on an opposite side of the light receiving element from the fixing surface and the light receiving surface is positioned at a location between the fixing surface and the second emission point in a direction perpendicular to the fixing surface.

3. The optical module according to claim 2, wherein the fixing surface is positioned in a recess provided in the carrier.

4. The optical module according to claim 1, wherein the light receiving surface faces in a direction that is opposite to a direction that the reflecting surface faces.

5. The optical module according to claim 1, wherein the reflecting surface is inclined as seen in a direction perpendicular to the fixing surface so that the back light emitted perpendicularly to the rear surface is reflected toward the light receiving surface.

6. The optical module according to claim 5, wherein the rear surface is perpendicular to an optical axis of the lens.

7. The optical module according to claim 5, wherein the reflecting surface is perpendicular to an optical axis of the lens.

8. The optical module according to claim 1, wherein the first emission point is deviated from an optical axis of the lens as seen in a direction perpendicular to the fixing surface.

* * * * *